May 30, 1972 — L. A. OSWALD — 3,666,431
APPARATUS FOR ADVANCING GLASS FIBERS
Filed Nov. 10, 1969 — 2 Sheets-Sheet 1

INVENTOR.
LEO ALEX OSWALD
BY
Staelin & Overman
ATTORNEYS

United States Patent Office 3,666,431
Patented May 30, 1972

3,666,431
APPARATUS FOR ADVANCING GLASS FIBERS
Leo Alex Oswald, Huntingdon, Pa., assignor to
Owens-Corning Fiberglas Corporation
Filed Nov. 10, 1969, Ser. No. 875,176
Int. Cl. C03b 37/00
U.S. Cl. 65—11 W                                   12 Claims

ABSTRACT OF THE DISCLOSURE

Apparatus for handling linear material such as a glass strand including a rotatably mounted member with spaced apart circumferentially disposed fingers on the member extending generally parallel to the member's axis of rotation and upon which the linear material collects as the member rotates.

BACKGROUND OF THE INVENTION

One may produce continuous filament glass strands by flowing molten streams from a feeder containing a supply of molten glass and then applying a pulling force to the individual streams sufficient to attenuate them into continuous filaments, which subsequently are combined into a strand. A winder packages the strand on a collector such as a tube. The collector acts as the attenuating means through high-speed rotation provided by the winder. When the required amount of strand winds into a package on the collector, the winder stops rotating the collector, which interrupts the attenuation of the glass filaments long enough to permit an operator to interchange an empty tube collector for the full tube.

An interruption is detrimental to the process of forming continuous filament glass. Proper thermal conditioning of the molten glass for a particular filament size requires strict adherence to produce a uniform product; such thermal conditioning tends to change during interruptions. Furthermore, if filament attenuation is intermittent, the process must be started anew after each change of the collector. Under these conditions an operator consumes much time getting all the hundreds or even thousands of streams of molten glass flowing properly from their feeder by orienting the filaments over sizing applicators, gathering shoes and perhaps even strand splitters to ready the process to attenuate the streams into filaments.

One must also provide proper thermal conditioning of the molten glass upon start up of a cold feeder prior to collecting the first wound package after commencing operations.

Because the practice of having operators draw the filaments from the streams by hand at start-up and between packages was not satisfactory, there arose the practice of employing a "secondary" or "interim" means for advancing a strand. Such "secondary" or "interim" means normally use cooperating rotating members that advance a strand to a waste collection zone. One type of cooperating roll arrangement employs a pair of rolls having smooth outer peripheral surfaces in contact. A second arrangement employs two rollers having peripheral surfaces fashioned with teeth, which are intermeshed in operation. Such arrangements have not been altogether successful.

As the toothed rolls advance a strand, the engaging teeth tend to cut the filament of the strand until none of the filaments are engaged in the rolls, the strand no longer being advanced.

"Roll wrap" limits the usefulness of cooperating rolls having smooth peripheral surfaces. As such rolls advance the strand, the strand tends to "lick" the peripheral surface of one of the rolls after initially passing between them until a loop or "licked" portion of the strand is thrown between the rolls again with traveling strand initially entering between them. The strand builds on the roll upon which the "licking" occurs similarly to a package until the strand entangles and breaks, the strand no longer being advanced.

Moreover, the prior art secondary strand advancing means moves the strand to a collection zone usually located below the strand advancing arrangement. Such an arrangement is not wholly satisfactory, especially when there is no collection space available below a winder.

SUMMARY OF THE INVENTION

An object of the invention is improved apparatus for handling linear material.

Another object of the invention is improved apparatus handling linear material such as continuous filament glass strands in a filament forming operation during times that there are interruptions in the primary collection of wound strand packages or prior to collecting the first primary strand package at start-up of filament forming operations.

Still another object of the invention is appratus including an interim means for advancing linear material associated with a winder that collects the strand as it advances.

These and other objects are attained by employing apparatus including a source of linear material such as glass strand together with a primary means for advancing the linear material along a path to a collection zone and an interim means for advancing the glass strand along another path during times when the primary means is not advancing the linear material where the interim means uses spaced apart elongated members on a rotatably mounted member. The elongated members are circumferentially disposed around the rotatable member's axis of rotation and extend generally parallel to the axis.

Other objects and advantages of the invention will become apparent as the invention is described hereinafter in more detail with reference made to the accompanying drawings.

DESCRIPTION OF THE PREFERRED EMBODIMENTS

While the invention is particularly valuable in processes for forming filaments of heat softened mineral fiber-forming material such as glass where apparatus combines individual continuous glass filaments to form a strand prior to collecting the glass strand as a wound package, one may use the invention in fiber forming operation and other manufacturing processes involving linear material such as textile material made from glass or other fiber-forming material, e.g. thermoplastic, chemical and natural fibers. Thus, the use of glass to explain the operation of the invention is an example only, the invention having use in other textile operations.

Figures 1, 2:
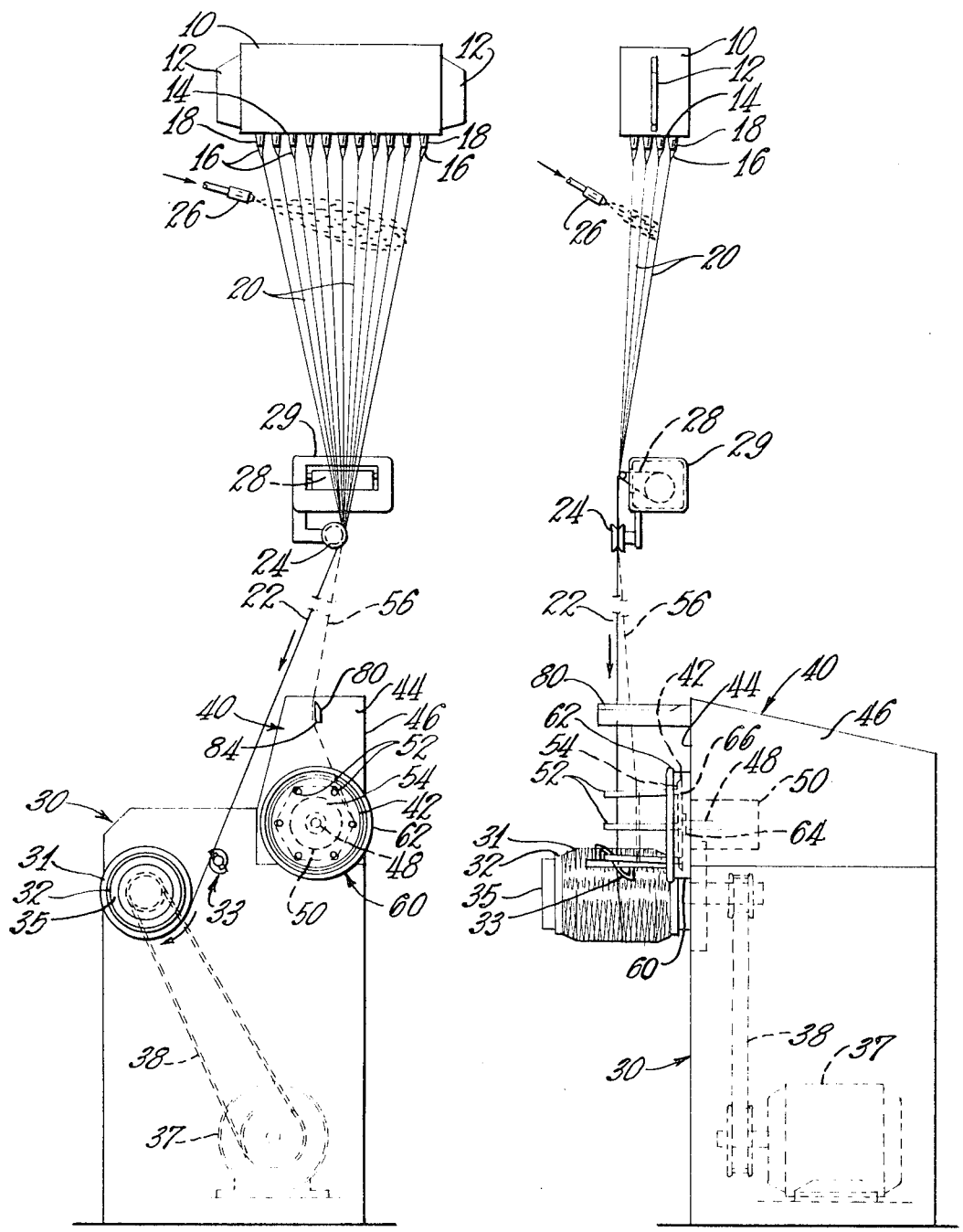
FIG. 1 is a somewhat diagrammatic front elevation view of apparatus according to the principles of the invention and that handles continuous filament glass strands at a filament forming position. The dashed line indicates the path of the strand during times when the strand advances by the action of interim strand advancing means.
FIG. 2 is a side elevation view of the apparatus illustrated in FIG. 1.

FIGS. 1 and 2 show apparatus for forming continuous filament glass strand that uses an interim strand advancing arrangement. FIGS. 1 and 2 illustrate a container or feeder 10 that holds a supply of molten glass. The container 10 may connect to a forehearth that supplies molten glass from a furnace or may connect to a means for supplying glass such as glass marbles that a melter or other means associated with the feeder or container 10 reduce to a heat softened condition. Located at the ends of the container are terminals 12 that connect to a source of electrical energy to supply heat by conventional resistance heating to the glass held in the container 10 to maintain the glass at a proper fiber-forming temperature and viscosity. Moreover, the container 10 has a bottom 14 that has a plurality of orifices or passageways for delivering streams 16 of the molten glass from the container 10. As shown, the openings in the bottom 14 comprise a plurality of depending orificed projections or tubular members 18.

The molten streams 16 are attenuated in individual continuous glass filaments 20 and are combined into a strand 22 at a gathering shoe 24 located below the container 10.

While the filaments 20 may be protected only by application of water to them, it is desirable in most instances to apply to them a conventional liquid sizing or other coating material. A nozzle 26 may be located near the bottom 14 to spray water onto the newly formed filaments 20, preferably prior to combining the filaments 20 into the strand 22. An applicator 28 supported within a housing 29 may be provided as shown in FIGS. 1 and 2 to apply the sizing or other coating material to the filaments 20. The applicator 28 may be any suitable means known to the art such as an endless belt that moves through the sizing or coating liquid held in the housing 29. As the filaments 20 pass across the surface of the applicator 28, some of the liquid on the moving applicator 28 transfers to them.

The strand 22 advances along a path to collect as a wound package 31 on a winder 30. Strand traversing apparatus 33 moves the advancing strand 22 back and forth along the length of the package 31 as it winds upon a collector such as a tube 32 that has been telescoped over a spindle or collet 35 journaled for rotation on the winder 30. A motor 37 located within the winder 30 appropriately rotates the collet 35 through a non-slipping belt 38. The collet 35 on the winder 30 operates as a primary means for attenuating the glass filaments 20 and advancing the strand 22. Appropriate conventional means within the winder 30 moves the strand traversing apparatus 33. The winder 30 can advance the strand 22 at linear strand speeds up to 10,000 feet per minute or more.

While the apparatus of the invention shown in FIGS. 1 and 2 illustrates a process for handling a single strand 22, the invention may be employed to simultaneously handle more than one strand.

On the winder 30 is an interim strand advancing arrangement or means 40 that includes a rotating member having a plurality of separated elongated members or surfaces around the axis of the rotation of the member. The interim means 40 is spaced from the primary means for advancing the glass strand, i.e. the collet 35 on the winder 30. As shown the rotatable member is a disc 42 located at a vertical wall 44 of a housing 46. The disc 42 is on the horizontally extending output shaft 48 of a motor 50 located within the housing 46. The motor 50, through its shaft 48, drives the disc 42 in rotation. The motor 50 is preferably a slow speed synchronous motor such as a SLO-SYN synchronous motor made by the Superior Electric Company. The elongated members are spaced apart rod-like fingers 52 that extend away from the disc's major surface 54, which faces away from the motor 50. As shown, the interim strand advancing arrangement 40 orients the fingers 52 in a circular pattern about the axis of rotation of the disc 42 to form a plurality of spaced apart elongated members around the axis of rotation of the disc 42 upon which the strand 22 collects. The circumferentially disposed fingers 52 extend generally parallel to the axis of rotation of the disc 42.

The interim strand advancing arrangement 40 normally moves and collects the strand 22 during times the winder 30 is not collecting a package, e.g. package 31. The dashed line 56 indicates the strand path to the arrangement 40 during its operation.

Because the motor 50 normally rotates the disc 42 at slow r.p.m., the interim strand advancing arrangement 40 usually moves the strand 22 at a slower linear strand speed than the primary strand advancing means. The arrangement 40 usually advances the strand 22 at a linear strand speed in the range of from 100 to 300 feet per minute. When one uses a slow speed synchronous motor as the motor 50, it normally rotates the disc 42 around 72 r.p.m.

Figure 3:
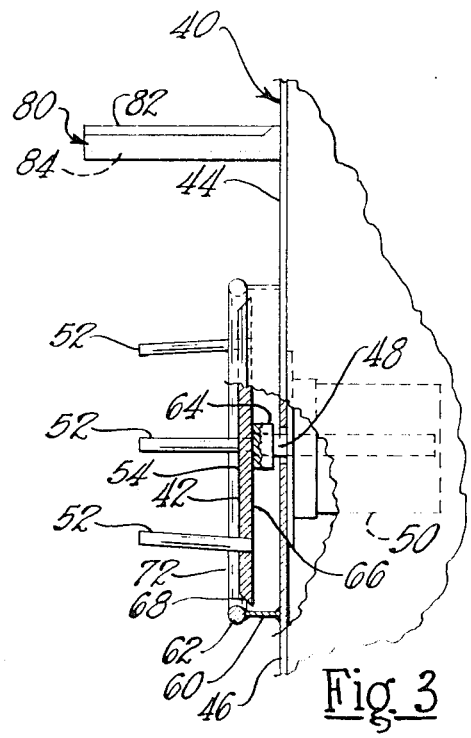
FIG. 3 is an enlarged side view of apparatus for interim means for advancing linear material according to the principles of the invention shown in FIGS. 1 and 2.
Figure 4:
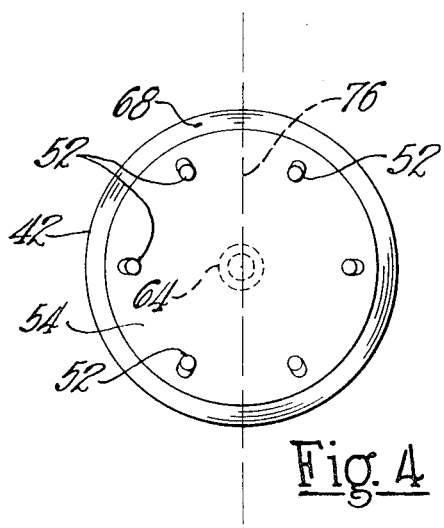
FIG. 4 is an enlarged front view of a disc and finger arrangement for use in advancing linear material according to the principles of the invention shown in FIGS. 1 and 2.

One can see the interim strand advancing arrangement 40 more clearly in FIGS. 3 and 4. The arrangement includes a rotating portion and a stationary portion. The rotating portion includes the disc 42 and its fingers 52. The stationary portion includes a tubular guard or shroud 60 and hoop-like guide 62, both on the vertical wall 44.

Disc 42 is a thin light weight unit having the fingers 52 extending from its major surface 54 and having a collar 64 centered thereon extending from its other major surface 66. The fingers 52 are in tilted disposition on the surface 54 to focus on a point. Usually the fingers tilt toward each other from 1 to 3 degrees from the perpendicular. The collar 64 mates with the motor shaft 48 to connect the disc 42 with the motor 50. Because the disc 42 has a beveled circumferential surface 68, the diameter of the major surface 66 is greater than the diameter of the major surface 54. While the disc 42 may be made of any suitable material, lighter weight materials are preferable. One can obtain good results using a disc made of aluminum.

In the embodiment shown in FIGS. 3 and 4 the plurality of spaced apart elongated members extending from the major surface 54 in the form of the fingers 52 form what one may, in a sense, consider a discontinuous generally cylindrical surface about the axis of rotation of the disc 42. As shown, the fingers 52 are equally spaced about the circumference of a circle on the disc's major surface 54 where the circle has a radius equal to the distance of the fingers from the center of the disc, which is on the disc's axis of rotation.

Figure 5:
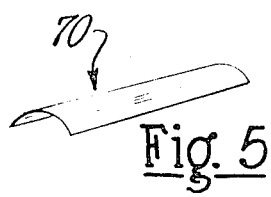
FIG. 5 is a perspective view of a modified elongated member or finger for use with the apparatus of the invention.

While the fingers 52 are shown as rod-like members, one may use other shaped strand support members to form the discontinuous surface upon which the strand 22 collects. For example, one may use an elongated curved shell 70 of the type shown in FIG. 5 with its convex surface facing outwardly on a rotating member. While a curved or nonlinear exterior support surface to collect strand material is preferred, one may employ linear surfaces such as found on a rectangular rod, etc.

While the figures show a preferred embodiment with each of the fingers 52 spaced apart an equal amount around the center of the disc 42, one may employ embodiments where fingers are spaced apart unequal angular distances. Moreover, while one may successfully employ less than six fingers 52, it has been found that one obtains smoother operation of the interim strand advancing arrangement 40 when using at least six fingers having equal angular spacing about the center of a rotating member. As illustrated the distance between adjacent fingers is sufficient to allow passage of the strand 22 therebetween.

The stationary portion of the interim strand advancing arrangement 40 includes the tubular guard 60 extending from the vertical wall 44 to terminate at an open end 72. Because the tubular guard 60 has an inside diameter greater than the diameter of the disc 42, there is an annular space between the circumferential surface of the disc 42 and the interior wall surface of the guard 60. As shown the hoop-like guide 62 is made of rod and is secured to the tubular guard at its open or free end 72 to form a smooth curved surface the open end 72. In the embodiment shown the disc 42 is within the tubular guard 60 intermediate the ends of the guard. The fingers 52 extend from the disc 42 to beyond the open end 72 for strand engagement.

Unlike prior art interim strand advancing arrangements the motor 50 normally rotates the disc 42 at all times, even during the collection of a primary package 31 on the winder 30. Accordingly, in operation an operator normally engages the strand 22 with the fingers 52 as the fingers are moving. The operator usually grasps the strand 22 at spaced apart locations along its length. He moves the length of strand between his hands towards the open end 72 of the tubular guard 60 into the moving fingers 52, which engage the strand 22 to commence collecting the strand 22 on the discontinuous cylindrical surface formed by the elongated surfaces of the fingers 52. Usually the strand engages the interim strand advancing arrangement 40 by entering into opposing spaces between the fingers 52 on opposite sides of the circle formed by the finger orientation. Dashed line 76 in FIG. 4 indicates such a strand disposition.

Because the tubular guard 60 shrouds or covers the moving or rotating portion of the arrangement 40 except for the fingers 52, accidental engagement of the strand 22 with rotating elements except the fingers is substantially precluded. In this regard, it is noted that the beveled surface 68 tends to push a strand towards the open end 72 when a strand engages the surface. Moreover, the hoop-like guide 62 provides a smooth curved surface against which the strand 22 may touch without breaking it.

It has been valuable to use strand severing means with the secondary strand advancing arrangement 40. FIGS. 1–3 show a strand severing means that uses a generally vertically oriented blade 80 with an upper cutting edge 82 and a rounded lower portion 84. More clearly seen in FIG. 1, the blade 80 is somewhat above the disc 42 in the vertical plane intersecting the axis of rotation of the disc 42. One may move the blade laterally from the vertical plane. When the disc 42 rotates clockwise, as indicated in FIG. 1, the strand 22 advances along a secondary path indicated by dash line 56 and moves across the surface of the blade 80, especially the rounded lower portion 84, to avoid the cutting edge 82. To sever the strand 22 an operator needs only to grasp the strand 22 above the blade 80 and pull the strand 22 downwardly across the cutting edge 82. Thereafter the operator can move the strand 22 to a collector on the collet 35 of the winder 30 to commence building a new package.

To remove the strand collected on the fingers 52 an operator can stop the disc 42 by hand and cut the material free. When the operator releases the fingers 52, the motor 50 again rotates the disc 42. The tilted finger arrangement assists the operator in removing strand material collected on the fingers 52. When the apparatus uses an angle greater than 3 degrees, it may be difficult to keep collecting strand on the fingers 52.

Figure 6:
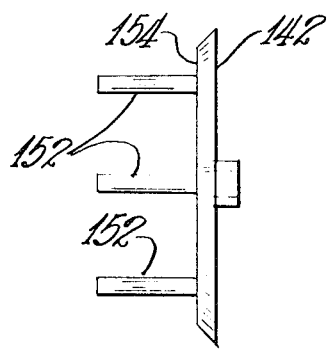
FIG. 6 is a side elevation view of modified disc and finger arrangement for use with the apparatus of the invention.

FIG. 6 shows a modified disc 142 for use with the secondary strand advancing arrangement 40 having fingers 152 that extend normally from the disc's major surface 154.

It is apparent that modifications and different arrangements may be made within the scope of the invention other than as herein disclosed. The present disclosure is merely illustrative, the invention comprehending all variations thereof.

I claim:
1. Apparatus for handling glass strand comprising:
means for supplying glass strand;
primary means for advancing the glass strand along a path to a collection zone;
strand traversing means for distributing the strand at the collection zone;
interim means for collecting the glass strand as waste, the interim means advancing the glass strand along another path during times when the primary means is not advancing the glass strand, the interim means being spaced from the primary means, the interim means comprising a member rotatably mounted on a substantially horizontal axis of rotation, spaced apart elongated members on the rotatable member upon which the glass strand is collected, the elongated members being circumferentially disposed around the axis of rotation of the rotatable member and extending generally parallel to the axis of rotation, adjacent elongated members being positioned to permit the glass strand therebetween, and means for rotating the rotatable member.

2. Apparatus for producing glass strand comprising:
means supplying molten glass streams for attenuation into continuous glass filaments;
means for gathering the glass filaments into a strand;
a rotatable collector upon which the glass strand is wound as a package, the collector advancing the glass strand along a path during collection of the strand;
strand traversing means for distributing the strand on the collector; and
interim means for attenuating the glass streams into continuous glass filaments, the interim means advancing the strand along another path during times when the primary means is not advancing the strand, the interim means being spaced from the collector, the interim means comprising a member rotatably mounted on a substantially horizontal axis of rotation, spaced apart elongated members on the rotatable member upon which the strand is collected, the elongated members being circumferentially disposed around the axis of rotation of the rotatable member and extending generally parallel to the axis of rotation, adjacent elongated members being positioned to permit the glass strand therebetween, and means for rotating the rotatable member.

3. Apparatus recited in claim 2 where the filaments are gathered by passing over a gathering member and the interim means is located in a secondary path for the strand in which the filaments are similarly gathered.

4. Apparatus for handling glass strand comprising:
means for supplying glass strand;
a rotatably mounted collector upon which the glass strand is wound as a package;
means for rotating the collector, the rotating collector advancing the glass strand along a path;
strand traversing means for distributing the strand on the collector; and
interim means for collecting the glass strand the interim means advancing the strand along another path during times when the collector is not advancing the glass strand, the interim means including a member rotatable on a substantially horizontal axis of rotation, spaced apart cantilever mounted fingers on the member for collecting the glass strand, the fingers being disposed circumferentially around the axis of rotation of the rotatable member, each of the fingers extending in a direction generally parallel to the axis of rotation, adjacent fingers being positioned to permit the glass strand therebetween, and means for rotating the rotatable member.

5. Apparatus recited in claim 4 where the fingers are disposed with equal angular spacing about the axis of rotation.

6. Apparatus recited in claim 5 where the fingers are spaced apart sufficiently close to effect a substantially uniform withdrawal of strand.

7. Apparatus for handling glass strand comprising:
means for supplying glass strand;
primary means for advancing the glass strand along a path and collecting the glass strand into a wound package;
strand traversing means for distributing the strand on the package during collection; and
an interim means for advancing and accumulating the glass strand along another path during times when the primary means is not advancing and collecting the strand, the interim means comprising a disc rotatably mounted on a substantially horizontal axis of rotation, spaced apart cantilever mounted fingers upon which the glass strand is collected, the fingers extending from a major surface of the disc around its axis of rotation, each of the fingers being laterally disposed the same distance from the axis of rotation and extending in a direction generally parallel to such axis, adjacent fingers being positioned to permit the glass strand therebetween, and means for rotating the disc.

8. Apparatus recited in claim 7 further including a tubular guard on the frame, the guard having an open end, the disc being located intermediate the ends of the guard with the fingers extending beyond the open end.

9. Apparatus recited in claim 8 further including a smooth rounded surface surrounding the open end of the tubular guard.

10. Apparatus for producing glass strand comprising:
means for supplying molten glass streams for attenuation into continuous glass filaments;
means for gathering the filaments into a glass strand;
a rotatably mounted collector upon which the glass strand is wound as a package;
means for rotating the collector;
means for reciprocating the advancing glass strand axially of the collector for distributing the strand on the collector; and
interim means for attenuating the streams into continuous filaments and for accumulating the glass strand at a slower linear strand speed than the rotating collector winds the strand, the interim means being spaced from the collector and the means for reciprocating the strand and used at times when the collector is not collecting the strand, the interim means comprising a rotatably mounted disc with its axis of rotation being substantially horizontal, spaced apart cantilever mounted fingers on the disc upon which the glass strand is collected, the fingers being circumferentially located around the axis of rotation of the disc, each of the fingers extending from the same side of the disc in a direction generally parallel to the axis of rotation, adjacent fingers being positioned to permit the strand therebetween, and means for rotating the disc.

11. Apparatus recited in claim 10 where the fingers are parallel to the axis of rotation.

12. Apparatus recited in claim 10 where the fingers are focused at a point and extend in a direction from 1 to 3 degrees from the axis of rotation.

References Cited
UNITED STATES PATENTS

| 2,352,781 | 7/1944 | Fletcher et al. | 242—18 G X |
| 2,377,771 | 6/1945 | Fletcher | 242—18 G X |
| 2,527,502 | 10/1950 | Simison et al. | 242—18 G X |

S. LEON BASHORE, Primary Examiner

R. L. LINDSAY, JR., Assistant Examiner

U.S. Cl. X.R.

65—2; 242—18 R, 18 G